United States Patent [19]

Moore

[11] 3,769,827

[45] Nov. 6, 1973

[54] INSTRUMENT FOR ELECTRICALLY MEASURING PRESSURE CHANGES

[75] Inventor: Alvin G. Moore, Cumberland, Md.

[73] Assignee: Hercules Incorporated, Wilmington, Del.

[22] Filed: Nov. 3, 1971

[21] Appl. No.: 195,516

Related U.S. Application Data

[62] Division of Ser. No. 29,208, April 16, 1970, Pat. No. 3,667,293.

[52] U.S. Cl. .................. 73/398 R, 73/179, 73/406
[51] Int. Cl. ..................... G01l 9/08, G01c 21/00
[58] Field of Search ............ 73/88.5 R, 179, 398 R, 73/398 AR, 406, 407

[56] References Cited
UNITED STATES PATENTS 3,667,293   6/1972   Moore ........................... 73/398 R
3,206,980   9/1965   Nelson .......................... 73/398 AR
3,258,971   7/1966   Padgett ......................... 73/88.5 SD
3,335,381   8/1967   Giovanni ....................... 73/398 AR Primary Examiner—Donald O. Woodiel
Attorney—Michael B. Keehan et al.

[57] ABSTRACT

An instrument for electrically measuring pressure changes having a circular bimorph and a thin flexure comprising iron-nickel alloy supporting the circular bimorph at its circumference and said flexure having its outer extremity adapted to support said bimorph in a pressure cell comprising iron-nickel alloy, whereby a high electrical output is obtained from the said bimorph in response to pressure being applied thereto.

7 Claims, 5 Drawing Figures

Patented Nov. 6, 1973

INSTRUMENT FOR ELECTRICALLY MEASURING PRESSURE CHANGES

This is a division of U.S. Pat. application Ser. No. 29,208, filed Apr. 16, 1970, now U.S. Pat. No. 3,667,293.

The present invention relates to an instrument including a sensor and particularly to a sensor of the bimorph type that is adapted for electrical measurement of pressure changes.

More particularly, this invention has direct application in general aviation as the sensor for a fast responsing rate of climb indicator, commonly called an instantaneous vertical speed indicator (IVSI). And also as the sensor for measuring the rate of change of total energy in a sailplane or helicopter and the like.

The conventional rate of climb indicator operates by measuring the pressure drop across a restriction or capillary placed in the pneumatic circuit between a fixed-volume reference chamber and the static pressure line of the aircraft. The pressure drop across the capillary is read out on the indicator as rate of climb.

Two major problems arise with conventional rate of climb indicators. The first problem is that because of the small differential pressure and associated flow in the pneumatic circuit, some time is required after each change in climb rate before the pressure-sensing capsule driving the indicator reaches its steady state position. The time lag of conventional instruments can be as long as 10 seconds, which diminishes their usefulness as primary instruments. The second problem is the "reversal effect." An aircraft is supported by a mound of air under excess pressure. This excess pressure extends to the earth's surface, diminishing with distance. When the aircraft starts to climb, vertical acceleration causes its weight to increase and raises the pressure within the supporting mound of air. The resulting pressure increase at the aircraft static port is sensed by the rate of climb indicator as descent; when in fact, the aircraft is climbing.

The above problems have been partially overcome by improvements involving the addition of components such as a spring, weight and dashpot to a conventional rate of climb instrument. These components cause a flow in the pneumatic measuring circuit responsive to acceleration, which improves the timeliness of the output indication. However, air speed, wing-loading, and error in the static source of a particular type of aircraft play a major part in the proper functioning of rate of climb indicators. While the foregoing improvements involve mechanical elements that can be tuned during manufacture for generally good performance, it is impractical to retune them in the field to best suit a particular type of aircraft.

A primary object of the present invention is to provide a sensor device for direct measurement of the pressure derivative (dp/dt) with an electrical output signal many fold greater than possible with prior art devices.

Another object of the present invention is to provide a rate of climb indicator responsive to acceleration with provision for easy field adjustment of the scale factor and time constant of the dp/dt and acceleration responsive elements. By means of these adjustments, the instrument response can be tuned to match the characteristics of a particular aircraft providing essentially instantaneous rate of climb information without lag or overshoot.

Still another object of the present invention is to combine two basic sensors pneumatically and electrically to provide an instrument that will indicate the rate of change of total energy in airplanes, sailplanes, helicopters, and other special purpose vehicles.

Other objects of the invention will appear hereinafter the novel features and combinations being set forth in the appended claims.

Generally described, the present invention comprises an instrument including a sensor which is designed to electrically measure pressure changes said sensor comprising in combination a circular bimorph, and a thin flexure comprising iron-nickel alloy supporting the circular bimorph at its circumference and said flexure having its outer extremity adapted to support said bimorph in a pressure cell comprising iron-nickel alloy, whereby a high electrical output is obtained from the said bimorph in response to pressure being applied thereto.

The foregoing invention is based on the unexpected high electrical output obtainable from a piezoelectric circular (bimorph) element when attached at its circumference to a thin flexure having characteristics compatible with the bimorph. This high electrical output fed into electrical circuit means provides for the manufacture of instruments responding to very minute pressure changes which changes are convertible to signals having informational value. The resulting basic dp/dt sensor may be utilized in new and novel configurations to operate as rate of climb indicators, instantaneous vertical speed indicators, and rate of change of total energy indicators. It was surprisingly found that the electrical output resulting from mechanical stress being placed on the circular piezoelectric (bimorph) element was increased about ten times when the element was supported by a thin circumferential flexure.

Preferred embodiments of the invention have been chosen for purposes of illustration and description and are shown in the accompanying drawings wherein reference symbols refer to like parts wherever they occur unless othewise designated and wherein.

Figure 1:
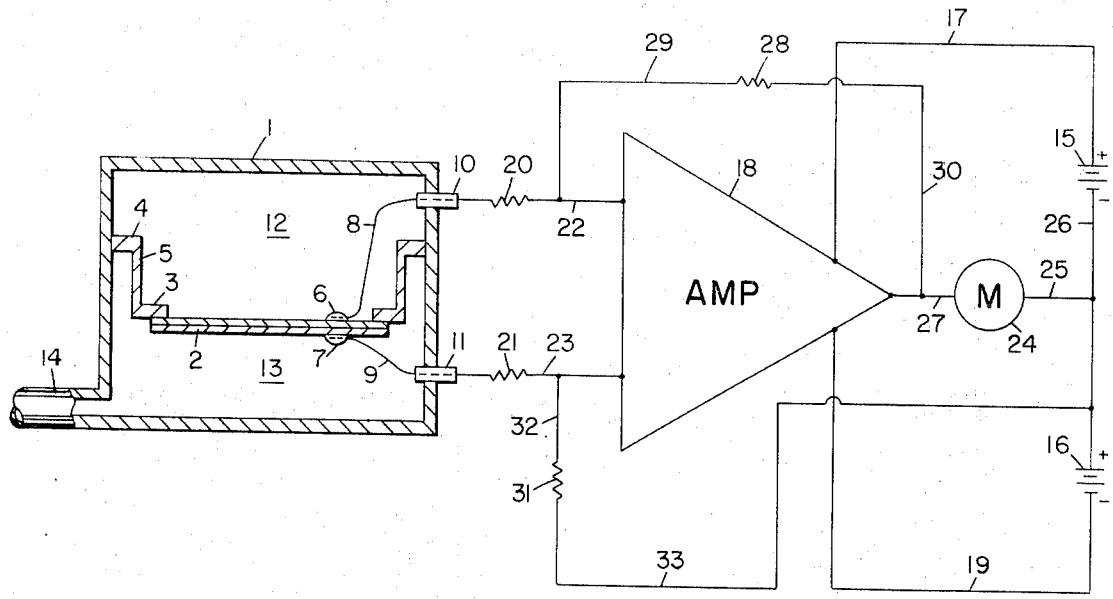
FIG. 1 is a schematic illustration of a rate of climb instrument embodying the present invention.

In FIG. 1, there is illustrated a rate of climb instrument comprising a circular fluid pressure cell 1 having a circular bimorph 2 supported therein. The support is preferably made in one piece and comprises an annular member 3 which is bonded to the bimorph 2, annular member 4 which is bonded to the interior wall of the cell 1 above the member 3 and a thin cylindrical flexure 5 extending from the outer periphery of the member 3 to the inner periphery of the member 4. Epoxy compound is used as the bonding agent. Electrical connections 6 and 7 having lead wires 8 and 9 are affixed, for example soldered, to the top and bottom of the bimorph 2. The lead wires 8 and 9 extend through insulating and sealing grommets 10 and 11 respectively which extend through the wall of the cell 1. The aforementioned construction provides a sealed reference chamber represented by 12 on one side of the bimorph 2. A variable pressure chamber represented by 13 having a conduit 14 connected to a static source (not shown) is provided on the other side of the bimorph 2. The bimorph 2 is a Clevite No. PZT- 5B bimorph having a capacity of 0.04 mfg. This bimorph element is manufactured by the Clevite Corporation of Bedford, Ohio. The element is 1.5 inches in diameter and 0.024 inch thick.

The electric circuit used in conjunction with the foregoing is energized by two 12 volt D.C. batteries represented by 15 and 16. A lead wire 17 is connected to the positive terminal of the battery 15 and to a transistor amplifier 18. A lead wire 19 is connected to the negative terminal of the battery 16 and to the amplifier 18. The lead wires 8 and 9 from the bimorph 2 are connected to resistors 20 and 21, respectively, which in turn are connected by lead wires 22 and 23 to the amplifier 18. The resistors 20 and 21 each has a resistance of 22 megohm (meg). A calibrated meter 24 has one of its terminals connected by lead wire 25 to lead wire 26 which is connected to the negative terminal of the battery 15 and to the positive terminal of the battery 16. The other terminal of the meter 24 is connected by lead wire 27 to the amplifier 18. A resistor 28 (66 meg) is connected by lead wires 29 and 30 to lead wires 22 and 27, respectively. A resistor 31 (66 meg) is connected by lead wires 32 and 33 to lead wires 23 and 26, respectively. The meter 24 has a range of 0.5-0-5.0 milliampere (ma). The amplifier 18 is a Philbrick/Nexus 100301 amplifier having a gain of 3 in this circuit. This amplifier is manufactured by Philbrick/Nexus Research of Dedham, Massachusetts. The electrical output of the foregoing sensor is directly related to the direction and magnitude of forces applied normal to surfaces of the bimorph. Since the thin flexure supporting the bimorph increases its electrical output many fold, the sensor provides excellent response to delicate pressure changes.

In operation, chamber 13 is connected to the static port of the aircraft by means of conduit 14. At the aircraft ascends, the pressure in chamber 13 is lowered, which causes the bimorph sensor 2 to deflect toward 13. When the pressure continues to change for a period of time that is long compared to the time constant of the bimorph 2 and its loading resistors 20 and 21, a signal is generated between contacts 6 and 7 that is related to rate of change of pressure or rate of climb. This signal is amplified and presented on meter 24 in convenient rate of climb units such as feet per minute.

In the rate of climb instruments, such as is illustrated in FIG. 1, the forces are produced by differential pressure. The dp/dt signal is obtained at the time constant desired by loading the bimorph element 2 with an external resistor R, 44 megohms (20 and 21 in FIG. 1). This causes the output voltage to be related to dp/dt when the cyclic pressure changes are much slower than the time constant of the bimorph and resistor network. With this loading the time constant RC if 1.76 seconds; C being the capacitance of the bimorph element (about 0.04 mfd for the 1.5 inch element shown). Thus, $RC = 4.4 \times 10^7 \times 0.04 \times 10^{-6} = 1.76$ seconds.

Figure 2:
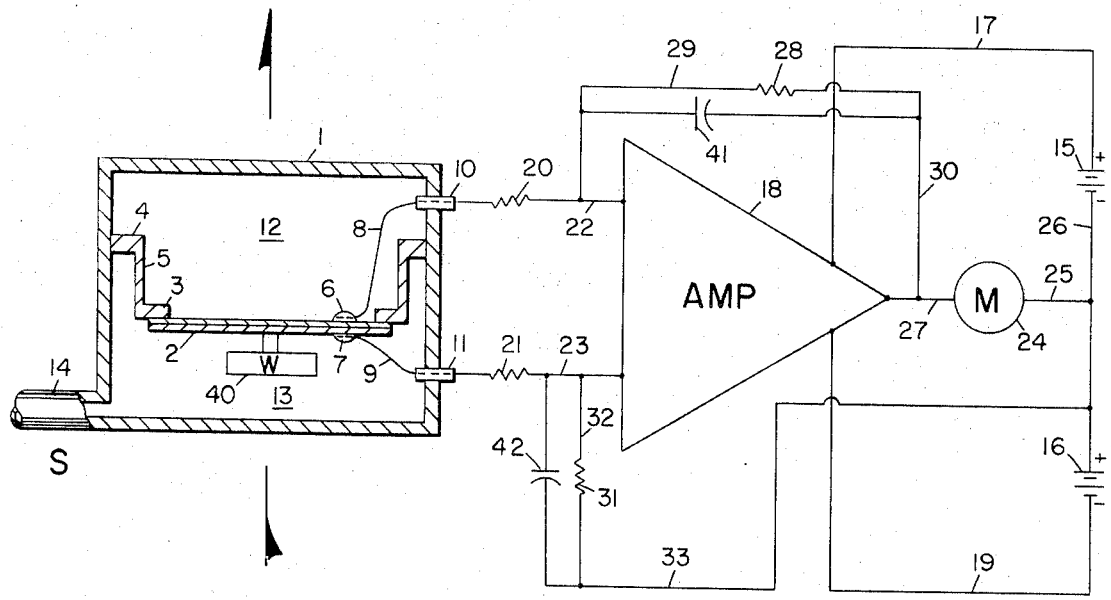
FIG. 2 is a schematic illustration of an instantaneous vertical speed indicator instrument embodying the invention.

In the instantaneous vertical speed indicator of FIG. 2, which is substantially identical to FIG. 1 except as hereinafter noted, a weight 40 is affixed to the bimorph element 2, and the sensor instrument is then mounted vertically in an aircraft as shown in FIG. 2. The weight 40, acting under the influence of the g force on the aircraft, causes the bimorph 2 to produce a signal responsive to acceleration. Initially the signal produced by the g force is proportional to acceleration, but then the signal drops out at the time constant RC. This drop out is necessary to prevent an unwanted indication remaining during a prolonged high g turn. The variable capacitors 41 and 42 connected between leads 29 and 30 and 23 and 33, respectively, are used for additional signal smoothing. The circuit in FIG. 2 operates substantially identical to that in FIG. 1 except that the weight 40 compensates for the "reversal effect" which has been heretofore described.

Figure 3:
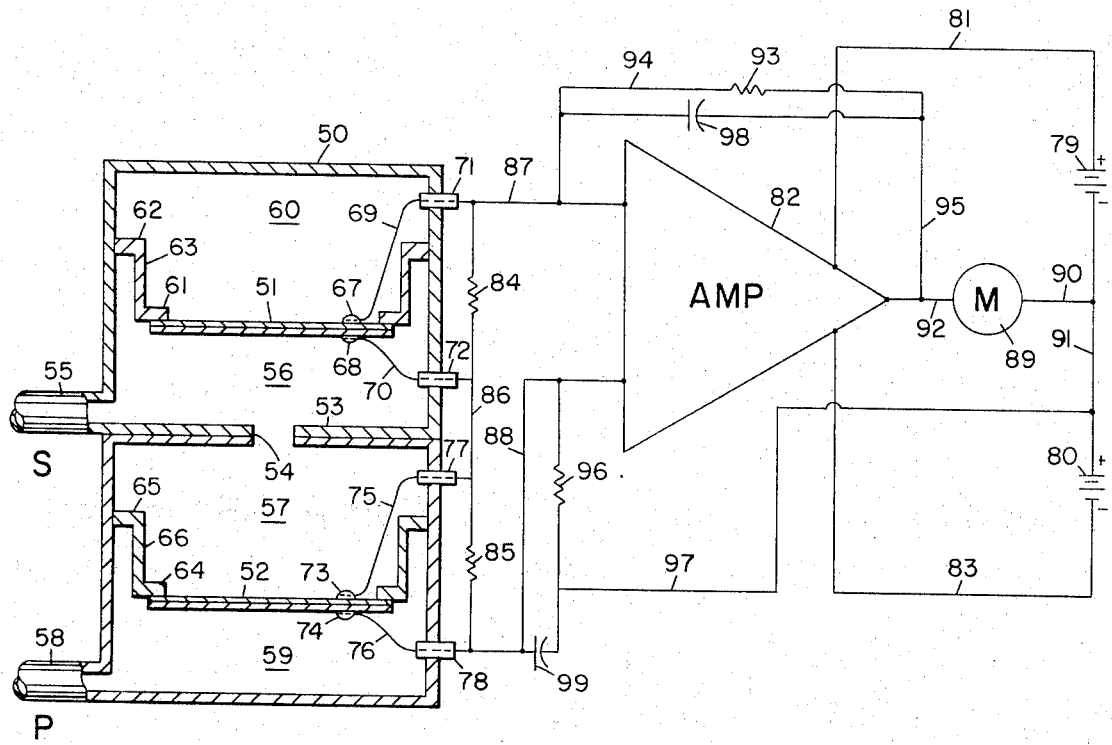
FIG. 3 is a schematic illustration of a rate of change of total energy indicator instrument embodying the invention.

In FIG. 3 there is illustrated a rate of change of total energy indicator. In the case of a sailplane, travel along the flight path is obtained by exchanging energy for distance. At the pilot's convenience, he can exchange potential energy (weight × height) for kinetic energy (½ mass × velocity$^2$). But, while the pilot is changing air speed by diving or zooming, he still needs to know whether or not he is flying through beneficial lift.

A rate of climb indicator shows the rate of change of potential energy, and the rate of change of pitot pressure is a measure of rate of change of kinetic energy. By combining these two signals as shown in FIG. 3, an instrument is provided that shows rate of change of total energy directly. This is the first instrument operating from pitot and static signals that indicates rate of change of total energy accurately at all altitudes in the troposphere. Other instruments which also use pitot and static signals for total energy compensation, are only accurately compensated at one altitude.

Thus, with reference to FIG. 3, the foregoing instrument comprises a circular, fluid pressure cell 50 having a circular bimorph 51 supported in the upper portion thereof and having a circular bimorph 52 supported in the lower portion. A dividing wall 53 having an aperture 54 divides the cell 50 into the upper and lower portions. A conduit 55 connected to a static source (not shown) provides static pressure to the zone 56 at the bottom side of the bimorph 51 and through the aperture 54 provides static pressure to the zone 57 at the top side of the bimorph 52. A conduit 58 connected to a pitot tube source (not shown) provides pitot pressure to the zone 59 at the bottom side of the bimorph 52. A sealed reference chamber 60 is provided at the top side of the bimorph 51. The annular members 61 and 62 and the thin cylindrical flexure 63 utilized in support of the bimorph 51 are identical in construction and support to the bimorph of FIG. 1. Also, the annular members 64 and 65 and the thin cylindrical flexure 66 utilized in support of the bimorph 52 are identical in construction and support to the bimorph of FIG. 1. And similarly, the connections at 67 and 68, the leads 69 and 70 and the grommets 71 and 72 associated with bimorph 51 and the connections at 73 and 74, the leads at 75 and 76, and the grommets 77 and 78 associated with bimorph 52 are all identical with the like parts illustrated and described for FIG. 1.

The electric circuit used in conjunction with the foregoing is energized by two 4 volt D.C. batteries represented by 79 and 80. A lead wire 81 is connected to the positive terminal of the battery 79 and to a transitor amplifier 82. A lead wire 83 is connected to the negative terminal of the battery 80 and to the amplifier 82. The lead wires 69 and 70 have a shunt resistor 84 (22 meg) and the lead wires 75 and 76 have a shunt resistor 85 (22 meg). The resistors 84 and 85 are connected to each other at one end by lead wire 86 with the other end of resistor 84 being connected to the amplifier 82 by lead wire 87 and with the other end of resistor 85 being connected to the amplifier 82 by lead wire 88. A calibrated meter 89 has one of its terminals connected by lead wire 90 to lead wire 91 which is connected to the negative terminal of the battery 79 and to the positive terminal of the battery 80. The other terminal of the meter 24 is connected by lead wire 92 to the amplifier 82. A resistor 93 (44 meg) is connected by lead wires 94 and 95 to lead wires 87 and 92, respectively. A resistor 96 (44 meg) is connected to lead wire 88 and to a lead wire 97 which is connected to the positive terminal of battery 80. A variable capacitor 98 is connected between lead wires 94 and 95 and a variable capacitor 99 is connected between lead wires 88 and 97. The meter 89 and the amplifier 82 are the same as described for FIG. 1 with the exception that the latter is a Philbrick/Nexus No. 1006 having a gain equal to 2.

In the embodiment of FIG. 3, cell 50 is connected to the static source of a sailplane, for example, and provides an output signal across resistor 84 that is related to rate of climb or rate of change of potential energy. Bimorph 52 is responsive both to changes of pressure at the static source through opening 54 and to pitot pressure changes through conduit 58. The net result is that bimorph 52 provides an output across resistor 85 directly related to the rate of change of indicated air speed or rate of change of kinetic energy. The signals derived from rate of climb and rate of change of air speed are combined in the input circuit resistors 84 and 85 of amplifier 82 and read out on meter 89 as rate of change of total energy. The gain of amplifier 82 is set to provide output indications in convenient units. With the circuit described for FIG. 3 full scale is equal to ± 500 feet per minute.

The instrument illustrated in FIG. 2 for instantaneous vertical speed indication can be modified by using a second bimorph for the acceleration responsive element. This can be accomplished by adding a weight, similar to that shown in FIG. 2, to bimorph 52 in FIG. 3. For IVSI applications, the static line of the aircraft is connected to 58 and 55 of FIG. 3. This configuration allows completely independent tuning and mixing of the dp/dt and acceleration signals. Tuning for a particular aircraft would involve changing one resistor 85 as shown in FIG. 3. By adjusting this one resistor, the "reversal effect" can be eliminated.

Figure 4:
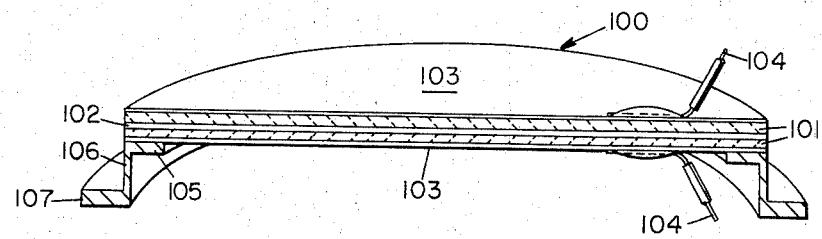
FIG. 4 is an enlarged cross sectional view of the bimorph element and flexure attachment depicted in FIGS. 1, 2 and 3.

FIG. 4 shows a bimorph attached to a flexure. This bimorph sensor is similar to those used in the instruments heretofore described. More particularly, the bimorph sensor 100 is inverted relative to the previous illustrations and comprises a pair of disc-like piezoelectric crystals 101 having an electrically conducting plate 102 disposed therebetween which may for example be brass and a conductive coating 103 such as silver on the outer faces. The two discs 101 are positioned with the plate 102 therebetween and bonded thereto as by an epoxy resin. The electrical connections are made to the outer faces of the bimorph sensor 100 by leads 104 which are for example soldered to the coating 103. The flexure is preferably of one piece and comprises an annular member 105 bonded to one side of the coating 103 and a thin cylindrical flexure 106 extending from the outer periphery of the member 105 to the inner periphery of an annular member 107. Alternatively, the coating 103 may be removed for a distance sufficient to allow member 105 to be bonded directly to the lower crystal 101. The diameter of the bimorph sensor 100 is 1.500 inches for the crystals 101 with an overall diameter of 1.625 inches including the outer annular member 107. The inner annular member 105 is 0.020 inch wide and 0.005 inch thick. The outer annular member 107 is about twice as wide as the inner member 105 but particularly is sized to fit the desired pressure cell and is 0.015 inch thick. The cylindrical flexure 106 has a length of 0.075 inch and has a wall thickness of 0.0025 inch. All bonding is accomplished with epoxy resin and fillets of about 0.005 radius are provided at all inner right angles including bonding of the bimorph sensor in a pressure cell or the like.

Figure 5:
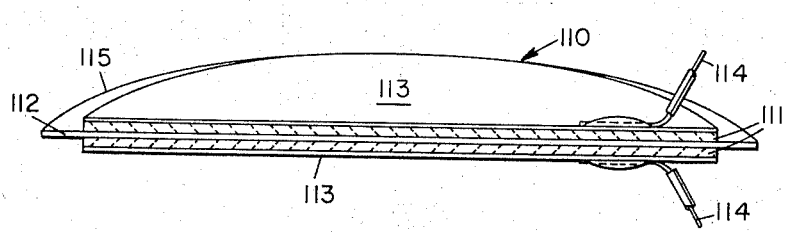
FIG. 5 is an enlarged cross sectional view of a bimorph element modification having its metal center as the flexure means.

FIG. 5 shows an alternative embodiment of a bimorph attached to a thin flexure. In this embodiment of the invention, the bimorph sensor 110 has piezoelectric crystals 111, central plate 112, conductive coatings 113, and electrical leads 114, all similar to those illustrated and described in FIG. 4. The thin flexure 115, however, is obtained by having the central plate 112 radially extend beyond the crystals 111 to form the thin flexure, the extremity of which serves for attachment. The diameter of the bimorph sensor 110 is 1.500 inches overall including the thin flexure which is 0.090 inch wide and 0.003 inch thick. The thickness of each of the bimorphs described in FIG. 4 and in FIG. 5 is 0.024 inch and the bonding with epoxy resin was similar in each case.

Material selection for the flexure and cells strongly influence the temperature sensitivity of the completed instrument. Aluminum and Invar metal have been tried. From these tests it is concluded that near perfect temperature compensation can be obtained by proper material selection. In the above instruments, replacing aluminum in the flexure and cells with Invar gave a five times decrease in unwanted output due to thermal shock. Moreover Invar has a co-efficient of expansion that substantially matches that of the bimorph so that there is minimum stress at the bond line where the flexure is bonded thereto. Invar is an iron-nickel alloy having a low co-efficient of expansion and is manufactured by Latrobe Steel Company of Latrobe, Pa.

The flexure is preferably of material of the Invar type for the reasons given above. Moreover, it should be kept thin, that is, having a thickness of from about 0.002 to about 0.004 inch thick and to insure proper flexing should extend from about 20 to about 40 times its thickness whether being used as a cylinder as depicted in FIG. 4 or as a flat disc as depicted in FIG. 5 or other configuration intermediate of these.

The circular bimorph is of construction known in the art wherein two piezoelectric plates cemented together causes one to expand and the other to contract, so that the cell bends in proportion to the applied voltage. Conversely, applied pressure will generate double the voltage of a single cell and it is this latter characteristic which is utilized in the present invention and where in combination with the flexure the applied pressure generates from about 10 to about 20 times the voltage of a single cell. The bimorphs preferably for use in conjunction with the present invention are from about 0.5 to about 2 inches in diameter and from about 0.020 to about 0.030 inch in thickness. And in conjunction with bimorphs of this size, the weight 40 such as depicted in FIG. 2 is from about 10 to about 20 grams.

The output of the rate of climb indicator is directly related to dp/dt when the cyclic change in pressure is slow (several seconds) compared to the time constant of the instrument (less than 2 seconds). Since the atmospheric pressure gradient diminishes with altitude, the indicated rate of climb is 50 percent of what it should be at 22 thousand feet. This fall out in sensitivity with altitude can be offset by evacuating the sealed reference chamber. As the pressure is reduced in the reference chamber, the bimorph element will bend in and become stiffer. At the higher altitudes as the pressure diminishes, the element will return toward the flat, more sensitive position. Experiments show that nearly uniform sensitivity with altitude can be obtained.

On the other hand, where the true dp/dt characteristics are essential and used as operational elements (such as in the rate of change of total energy indicator) some other means of controlling sensitivity changes must be provided. Methods such as follows may be used. One method is to add a manual control, marked in altitude, that the pilot could adjust in flight. This control would change the gain of the operational amplifier by an amount sufficient to offset the loss in sensitivity due to altitude changes. Another method is to add an aneroid element driving a variable resistor to do the same job as the above manual control.

Principal uses of the present invention reside in dp/dt sensors in air data systems and industry, including stabilization of altitude hold systems; rate of climb indicators for aircraft; instantaneous vertical speed indicators for aircraft; and rate of change of total energy indicator for airplanes, helicopters, sailplanes, and other special purpose vehicles.

The advantages of the invention are multifold and include providing an output signal that is primarily responsive to dp/dt, the desired signal; the response of the IVSI version can be easily tailored to a particular aircraft; the total energy configuration will do a near perfect job of total energy compensation at all altitudes in the troposphere, and may be adapted for underwater use; and fast response, since the basic sensor is electrical, response time can be increased or decreased as desired.

What I claim and desire to protect by Letters Patent is:

1. An instrument for electrically measuring pressure changes comprising:
    a. a fluid pressure cell;
    b. a circular bimorph sensor element mounted in said cell to provide a reference pressure chamber on one side thereof and a variable pressure chamber on the other side thereof, said circular bimorph sensor element adapted to produce an electrical output in response to pressure being applied thereto; and
    c. flexure member means for supporting said circular bimorph sensor element at the circumference thereof and for sealing said reference pressure chamber from said variable pressure chamber.

2. An instrument in accordance with claim 1 wherein said flexure member means includes a thin flexure member extending substantially cylindrically from said circular bimorph sensor element.

3. An instrument in accordance with claim 1 wherein said flexure member means includes a thin flexure member extending radially from said bimorph sensor element.

4. An instrument in accordance with claim 2 wherein said thin flexure member extending cylindrically from said bimorph sensing element extends from a first annular member affixed to one side of said bimorph sensing element to a second annular member adapted to support said bimorph sensing element within said cell.

5. An instrument for electrically measuring rate of change of pressure comprising:
    a. a fluid pressure cell;
    b. bimorph sensing means mounted in said cell to provide a reference pressure chamber on one side thereof and a variable fluid pressure chamber on the other side thereof, said variable fluid pressure chamber being in communication with a static pressure conduit, said bimorph sensing means adapted to produce an electrical output in response to pressure changes in said variable pressure chamber;
    c. flexure member means for supporting said bimorph sensing means within said pressure cell and for sealing said reference pressure chamber from said variable fluid pressure chamber; and
    d. means responsive to an electrical output produced by said bimorph sensing means for generating a signal having informational value based on the rate of change of pressure.

6. An instrument in accordance with claim 1 wherein said fluid pressure cell is made of an iron-nickel alloy and said flexure member means includes a thin flexure member made of an iron-nickel alloy.

7. An instrument in accordance with claim 1 including a pair of circular bimorph sensor elements and wherein said flexure member means includes a thin plate sandwiched between said sensor elements and radially extending beyond the circumferences thereof for attachment to said pressure cell.

* * * * *